United States Patent
Tang et al.

(10) Patent No.: US 11,802,417 B2
(45) Date of Patent: Oct. 31, 2023

(54) ROBOTIC POOL CLEANER

(71) Applicant: BEIJING SMOROBOT TECHNOLOGY CO., LTD, Beijing (CN)

(72) Inventors: Jie Tang, Beijing (CN); Yaming Tang, Beijing (CN)

(73) Assignee: BEIJING SMOROBOT TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/901,738

(22) Filed: Sep. 1, 2022

(65) Prior Publication Data

US 2023/0250664 A1    Aug. 10, 2023

Related U.S. Application Data

(63) Continuation-in-part of application No. PCT/CN2022/075664, filed on Feb. 9, 2022.

(51) Int. Cl.
*E04H 4/16* (2006.01)
*B62D 55/30* (2006.01)
*B62D 55/12* (2006.01)

(52) U.S. Cl.
CPC ........... *E04H 4/1654* (2013.01); *B62D 55/12* (2013.01); *B62D 55/30* (2013.01)

(58) Field of Classification Search
CPC .......... E04H 4/16; E04H 4/1654; B62D 55/30
See application file for complete search history.

(56) References Cited

U.S. PATENT DOCUMENTS

| | | | |
|---|---|---|---|
| 9,119,463 B2 * | 9/2015 | Gopalan | E04H 4/1654 |
| 2016/0145884 A1 * | 5/2016 | Erlich | E04H 4/1654 15/1.7 |
| 2021/0079679 A1 * | 3/2021 | Hui | E04H 4/16 |

FOREIGN PATENT DOCUMENTS

CN      110670918 A  *  1/2020  ........... E04H 4/1654

OTHER PUBLICATIONS

Patent Translation for Chinese Patent (110670918). Jan. 2020.*

* cited by examiner

*Primary Examiner* — Michael D Jennings
(74) *Attorney, Agent, or Firm* — Emerson, Thomson & Bennett, LLC; Roger D. Emerson; Jarrett Wyatt

(57) ABSTRACT

A robotic pool cleaner includes a cleaning body, a drive and a cleaning roller brush mechanism. The robotic pool cleaner filters liquid and/or contaminants in a pool through the cleaning body. The drive mechanism is connected to the cleaning body, which is driven to move in the pool in a working process of the robotic pool cleaner. The drive mechanism includes a drive wheel with a first outer ring gear. The cleaning roller brush mechanism is coupled with the first outer ring gear through a transmission belt, so that the cleaning roller brush mechanism is driven by the first outer ring gear to rotate relative to the cleaning body when the drive motor drives the first outer ring gear to rotate. The robotic pool cleaner improves cleaning efficiency and reduces wear of a cleaning roller brush, thereby prolonging the service life of the cleaning roller brush mechanism.

17 Claims, 11 Drawing Sheets

ROBOTIC POOL CLEANER

CROSS-REFERENCE TO RELATED APPLICATIONS

This application claims priority benefits to PCT Application No.: PCT/CN2022/075664, entitled "Pool Cleaning Robot With Externally Engaged Roller Brush", filed Feb. 9, 2022, the contents of which are incorporated herein by reference.

TECHNICAL FIELD

The present application relates to the technical field of cleaning apparatuses, and in particular, to a robotic pool cleaner.

BACKGROUND

A robotic pool cleaner is a cleaning robot produced for a pool cleaning need, which can repeatedly clean the bottom and walls of a swimming pool and filter water in the pool. In a working process, the robotic pool cleaner drives a moving mechanism through a drive motor, so that the robotic pool cleaner moves on a surface of the pool, and further cleans contaminants on the surfaces of the pool through a roller brush that rolls on the surface of the pool.

A driving mode with a roller brush and a moving mechanism of an existing robotic pool cleaner is implemented by internally engaging the roller brush and a drive motor with the moving mechanism respectively, the driving mode requires high machining precision. In addition, in a use process, moving efficiency of the robotic pool cleaner is low. As a result, the roller brush is worn out greatly, and accordingly, the service life of the roller brush is short, thereby increasing use costs of the robotic pool cleaner.

SUMMARY

To resolve the existing problems in the art, embodiments of this application provide a robotic pool cleaner, to resolve the above problems at least partially.

The embodiments of this application provide a robotic pool cleaner comprising a cleaning body, a drive wheel and a cleaning roller brush mechanism. The cleaning body comprises a water inlet and a water outlet separated from the water inlet. The drive wheel is configured to rotate relative to the cleaning body, and comprises a first outer ring gear. The cleaning roller brush mechanism comprises a roller brush belt wheel and a transmission belt. The transmission belt is wound on the roller brush belt wheel and a first outer ring gear, and when the drive wheel rotates, the roller brush belt wheel is driven by the first outer ring gear to rotate relative to the drive wheel, so that the cleaning roller brush mechanism rotates relative to the cleaning body.

In some embodiments of this application, one end of the roller brush belt wheel extends into the drive wheel, and is provided with a sleeve portion, the sleeve portion corresponds to the first outer ring gear, the transmission belt is wound on the sleeve portion and the first outer ring gear.

In some embodiments of this application, the sleeve portion is provided with a roller brush gear, an inner ring gear is disposed on the inner surface of the transmission belt, the inner ring gear is engaged with the roller brush gear and the first outer ring gear respectively.

In some embodiments of this application, the outer circumference of the sleeve portion and the outer circumference of the first outer ring gear are flat. The inner surface of the transmission belt is attached to the outer circumference of the sleeve portion and the outer circumference of the first outer ring gear respectively.

In some embodiments of this application, a first recess is provided around the sleeve portion. A second recess is provided around the first outer ring gear accordingly. The transmission belt is provided with a rib projecting from the inner surface. The rib is correspondingly engaged in the first and second recesses.

In some embodiments of this application, there are a plurality of ribs arranged along the width direction of the transmission belt, and the quantity of the first recess and the second recess corresponds to the quantity of the ribs.

In some embodiments of this application, the robotic pool cleaner further comprises a drive motor and a driving gear. The drive motor is connected to the driving gear, which is engaged with the first outer ring gear, and the first outer ring gear is driven by the drive motor to rotate.

In some embodiments of this application, the first transmission ratio between the driving gear and the first outer ring gear is smaller than a first set value.

In some embodiments of this application, a second transmission ratio between the driving gear and the cleaning roller brush mechanism can be 1:1.

In some embodiments of this application, the first outer ring gear comprises a first tooth segment and a second tooth segment, the first tooth segment and the second tooth segment are sequentially arranged on the side facing the cleaning body 10 along the axial direction of the drive wheel. The driving gear is engaged with the first tooth segment, and the transmission belt is wound on the second tooth segment and the roller brush belt wheel.

In some embodiments of this application, the diameter of the first tooth segment is larger than that of the second tooth segment.

In some embodiments of this application, the cleaning roller brush mechanism further comprises a roller brush body, which is disposed on a side of the cleaning body, and could rotate relative to the cleaning body, to clean parts of the surface.

In some embodiments of this application, the water inlet is an inlet for sucking in liquid and/or contaminants in the pool. In a traveling direction of the robotic pool cleaner, the water inlet is behind the cleaning roller brush mechanism.

In some embodiments of this application, a rotation direction of the cleaning roller brush mechanism is configured to push the liquid and/or contaminants toward the water inlet.

In some embodiments of this application, the robotic pool cleaner further comprises a track, and the drive wheel further comprises a second outer ring gear, a diameter of the first outer ring gear is smaller than that of the second outer ring gear, the first outer ring gear and the second outer ring gear are disposed coaxially, the track is wound on the drive wheel and externally engaged with the second outer ring gear.

In some embodiments of this application, the robotic pool cleaner further comprises an engaged wheel, the engaged wheel and the drive wheel are disposed with a distance on the cleaning body, and are rotatable relative to the cleaning body. The engaged wheel comprises a third outer ring gear, a plurality of mating teeth are disposed on the inner surface of the track, the mating teeth are engaged with the second outer ring gear and the third outer ring gear respectively.

In some embodiments of this application, the second outer ring gear is connected to the first outer ring gear, the second outer ring gear is rotatable relative to the first outer ring gear, a rotational speed adjusting structure is disposed between the first outer ring gear and the second outer ring gear such that rotational speeds of the first outer ring gear and the second outer ring gear are different.

According to the robotic pool cleaner provided in the embodiments of this application, the drive motor of the drive mechanism is used as a power source to provide power for the drive wheel assembly and the cleaning roller brush mechanism, so that the drive wheel of the drive wheel assembly drives the cleaning body to move in the pool. In this way, the cleaning body can clean contaminants in the pool in a moving process, thereby implementing cleaning and purification of the pool. Since the first outer ring gear of the drive wheel and the cleaning roller brush mechanism are coupled by means of the transmission belt, so that the assembly can be simpler and more convenient, the requirement on machining precision is lowered, and the machining cost is reduced. In some embodiments of this application, the robotic pool cleaner implements transmission through the external engagement between the first outer ring gear of the drive wheel and the driving gear of the drive motor, to drive the second outer ring gear of the drive wheel to rotate to implement movement, so that the robotic pool cleaner can move for a longer distance in a certain period of time, and therefore, the moving efficiency of the robotic pool cleaner is improved, and cleaning efficiency is improved accordingly. In addition, since the cleaning roller brush mechanism implements rotation by means of the coupling of the transmission belt and the first outer ring gear of the drive wheel, while ensuring the cleaning effects, the cleaning roller brush mechanism can clean for a longer distance in a certain period of time, so that the utilization rate of the cleaning roller brush mechanism is higher, wear of the cleaning roller brush mechanism is reduced to some extent, and the service life of the cleaning roller bush mechanism is prolonged.

BRIEF DESCRIPTION OF DRAWINGS

The following drawings are intended only to schematically illustrate and explain this application and are not intended to limit the scope of this application. in which.

Figure 1:
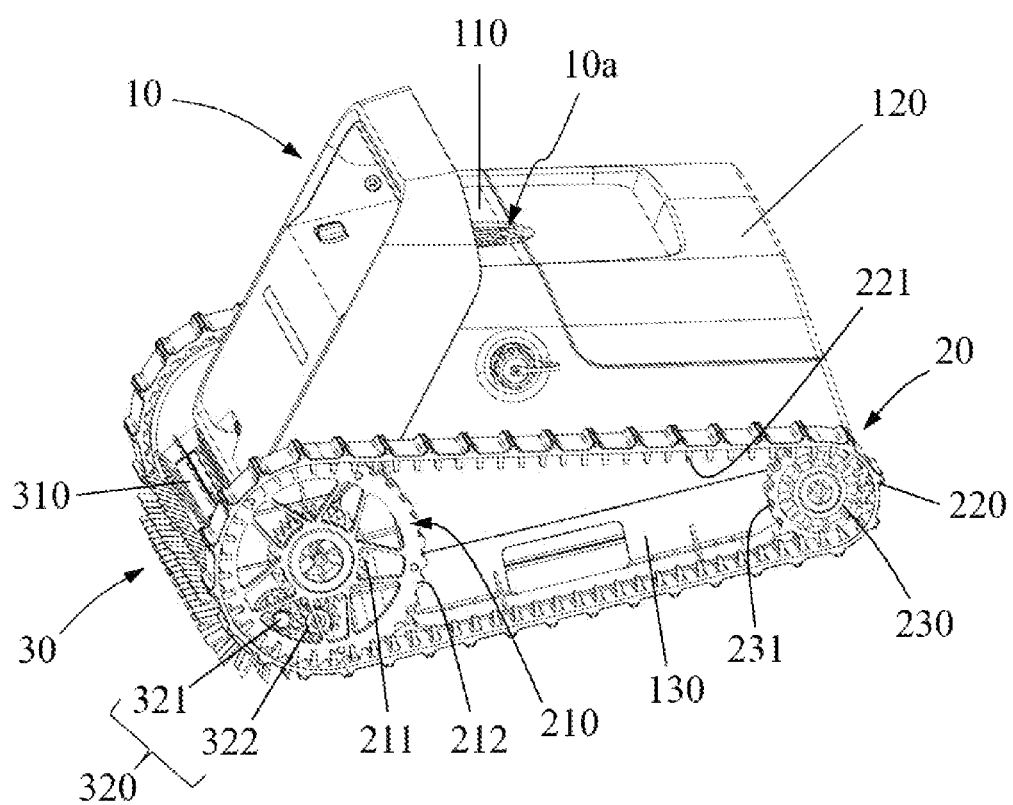
FIG. 1 is a perspective view of a robotic pool cleaner according to an embodiment of this application.
Figure 2:
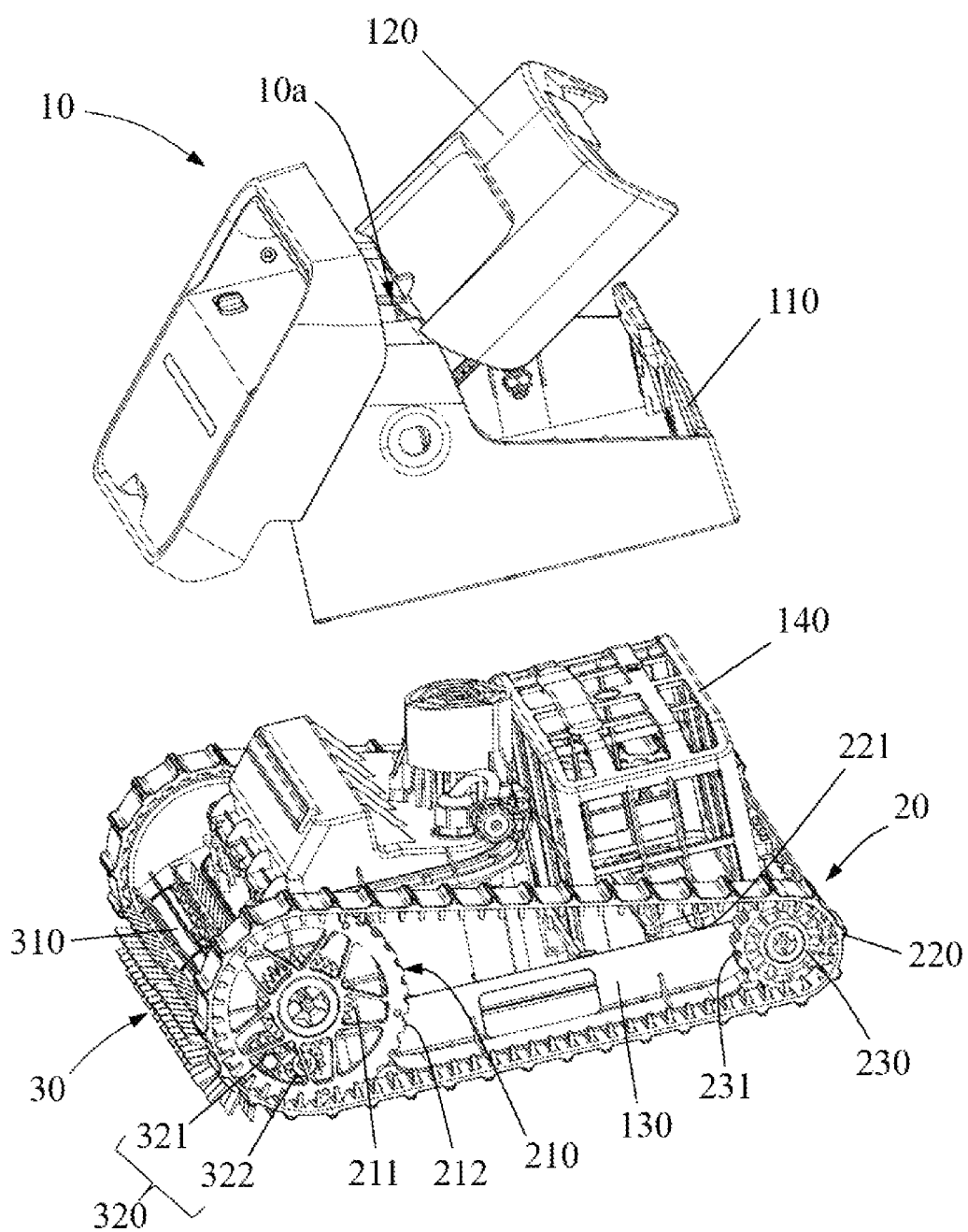
FIG. 2 is a partial exploded view of a robotic pool cleaner according to an embodiment of this application.
Figure 3:
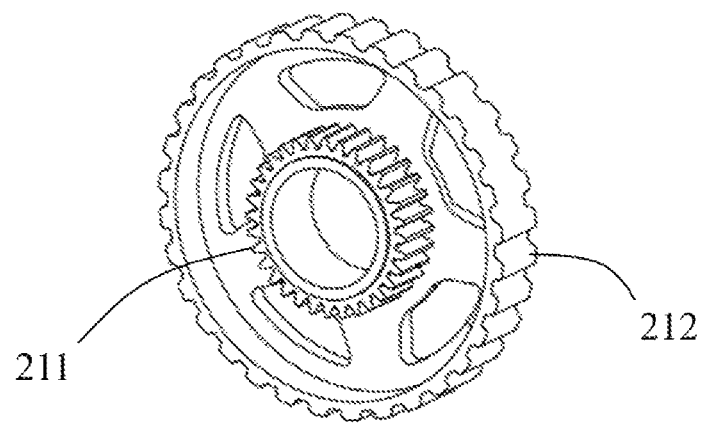
FIG. 3 is a schematic view of a structure of a drive wheel according to an embodiment of this application.
Figure 4:
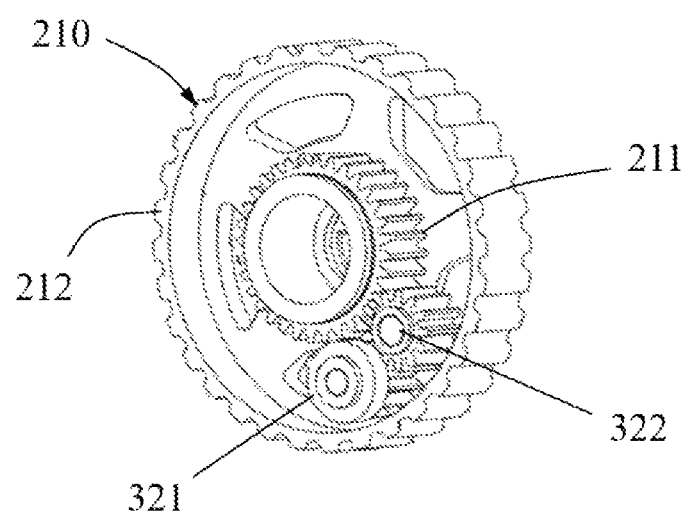
FIG. 4 is a schematic view of a structure of a cleaning roller brush mechanism in combination with a drive wheel according to an embodiment of this application.

REFERENCE SIGNS 1. robotic pool cleaner; 10. cleaning body; 10a. water outlet; 110. upper case; 120. movable turn-over cover; 130. bottom case; 20. drive mechanism; 210. drive wheel; 211. first outer ring gear; 2111. first tooth segment; 2112. second tooth segment; 2113. recess; 212. second outer ring gear; 213. rotation shaft; 220. track; 221. mating teeth; 230. engaged wheel; 231. third outer ring gear; 240. driving gear; 250. carrier gear; 260. output shaft; 30. cleaning roller brush mechanism; 310. roller brush body; 311. drive end; 320. transmission mechanism; 321. roller brush gear; 322. carrier gear; 330. roller brush belt wheel; 331. sleeve portion; 332. convex ring; 333. recess; 340. transmission belt; 341. inner ring gear; 342. rib.

DESCRIPTION OF EMBODIMENTS

To have a clearer understanding of the technical features, objectives, and effects of the embodiments of this application, embodiments of this application will be described with reference to the drawings.

In this specification, "schematic" means "as an instance, example or explanation", and any illustration or embodiment described as "schematic" herein should not be interpreted as a more preferred or advantageous technical solution.

For simplicity of the drawings, only the parts relevant to this application are schematically shown in the drawings, which do not represent actual structures of products. In addition, to make the drawings simple and easy to understand, only one or more of components having the same structure or function in some drawings are schematically depicted, or only one or more of them are designated.

Before describing the structure of the robotic pool cleaner according to the embodiments of this application, an application scenario of the robotic pool cleaner is first briefly described with reference to the drawings, to facilitate understanding.

The embodiments of this mainly focus on improving a structure of a drive mechanism of a robotic pool cleaner, to improve moving efficiency and a cleaning effect of the robotic pool cleaner. Before the structure of the drive mechanism is described, an overall structure and a working process of the robotic pool cleaner will be briefly described:

FIG. 1 is a schematic view of a structure of a robotic pool cleaner, the robotic pool cleaner 1 in this embodiment of this application mainly comprises a cleaning body 10, a drive mechanism 20, and a cleaning roller brush mechanism 30.

The robotic pool cleaner 1 sucks in liquid and/or contaminants through the cleaning body 10, filters the liquid and/or contaminants through the cleaning body 10, leaves the contaminants inside the cleaning body 10, and discharges filtered liquid into the pool again. The foregoing process is repeated to complete filtering of the liquid in the pool. The drive mechanism 20 is connected to the cleaning body 10, to drive the cleaning body 10 to move in the pool in the working process of the robotic pool cleaner 1.

Therefore, while the liquid and/or contaminants is filtered through the cleaning body 10, as the cleaning body 10 moves in the pool, at least some of surfaces of the pool are cleaned by the cleaning roller brush mechanism 30, to complete cleaning the bottom and side walls of the pool, thereby achieving a purpose of cleaning the entire pool.

The structure and the working process of the robotic pool cleaner in the embodiments of this application are described below with reference to FIG. 1 to FIG. 4.

The robotic pool cleaner 1 in the embodiments of this application filters liquid and/or contaminants in a pool through the cleaning body 10. The cleaning body 10 comprises a housing for mounting the drive mechanism 20, the cleaning roller brush mechanism 30, and the like. In an example, the housing may comprise an upper case 130, a movable turn-over cover 120 and a bottom case 130. The upper case 110 is connected with the bottom case 130, and the upper case 110 is detachable relative to the bottom case 130, to facilitate cleaning or maintenance of parts inside the cleaning robot. The movable turn-over cover 120 is connected to the upper case 110, and the movable turn-over cover 120 is rotatable relative to the upper case 110, to facilitate replacing and cleaning of components inside the cleaning body 10.

To be able to suck in liquid and/or contaminants and the like in the pool, cleaning body 10 comprises a water inlet and a water outlet separated from the water inlet 10a. For example, an inlet is disposed underneath the bottom case 130 of the cleaning body 10 as a water inlet, the upper case 110 is provided with a water outlet 10a, and a filter basket 140 is disposed inside the cleaning body 10. The liquid and/or contaminants in the pool enter the cleaning body 10 through the water inlet on the bottom of the cleaning body 10 and pass through the filter basket 140, to leave the contaminants in the filter basket. The filtered liquid flows out of the robotic pool cleaner 1 through the water outlet on the upper case 110, and returns to the pool. The foregoing process is repeated to complete cleaning and filtering of the liquid and/or contaminants in the pool.

Alternatively, a one-way valve is disposed on the water inlet, to prevent water in the robotic pool cleaner 1 from flowing out reversely and affecting suction of water, and also to prevent contaminants inside the robotic pool cleaner from leaking into the pool again through the water inlet.

Preferably, in a traveling direction of the robotic pool cleaner 1, the water inlet is behind roller brush mechanism 30. With the above configuration, after the contaminants in front of the cleaning body 10 are removed by the cleaning roller brush mechanism 30, these removed contaminants will be sucked in through the water inlet that subsequently comes with the movement of the cleaning body 10, and filtered by the filter basket in the cleaning body 10, thereby improving the cleaning efficiency of the robotic pool cleaner 1.

Alternatively, in order to improve the efficiency of the robotic pool cleaner 1 in collecting contaminants, a rotation direction of the cleaning roller brush mechanism 30 is configured to push the contaminants toward the water inlet. When the rotation direction of the cleaning roller brush mechanism 30 is consistent with the traveling direction of the robotic pool cleaner 1, the removed contaminants can be easily pushed toward the water inlet, thereby further improving the cleaning efficiency of the robotic pool cleaner 1.

Certainly, in another embodiment, the rotation direction of the cleaning roller brush mechanism 30 may be opposite to the traveling direction of the robotic pool cleaner 1 based on a different relative position relationship between the cleaning roller brush mechanism 30 and the water inlet, and is not limited thereto.

For example, in the embodiment where the rotation direction of the cleaning roller brush mechanism 30 is opposite to the traveling direction of the robotic pool cleaner 1, a water inlet can be disposed on the upper case 10, and a suction device connected with the water inlet is disposed in the cleaning body 10. When the contaminants on the surface of the pool are removed by the cleaning roller brush mechanism 30 and pushed toward the water inlet, these contaminants will be sucked in through the water inlet by the sucking force generated by suction device, and after filtering through the filter basket 140, the contaminants are left inside the filter basket 140 and the filtered liquid flows through the water outlet from the robotic pool cleaner 1 out and returns into the pool.

It can be understood that, in some embodiments of this application, it is possible to increase the collecting efficiency of contaminants by providing water inlets on both the bottom side and the front side of the cleaning body 10. In such an embodiment, the cleaning roller brush mechanism 30 may be, but is not limited to, reciprocally rotatable relative to the cleaning body 10, for example by switching between clockwise rotation and counterclockwise rotation through a gear steering mechanism, thereby performing a cleaning process for relatively strongly adhered contaminants on the surface of the pool.

In some embodiments of this application, the water outlet on the upper case 110 can make a water outlet direction substantially perpendicular to a moving plane of the robotic pool cleaner 1, so that flow-out water can provide a better driving force for the robotic pool cleaner 1 to press the robotic pool cleaner 1 on the bottom surface or a side wall of the pool. This can guarantee reliability of climbing a wall (that is, moving on the side wall) and help the robotic pool cleaner suck in water to improve the cleaning efficiency.

In addition, a drainage port can be disposed at the rear side of the housing of the robotic pool cleaner 1. When the robotic pool cleaner 1 is removed from the pool, liquid inside the robotic pool cleaner may be discharged through the discharge port to reduce the weight of the robotic pool cleaner 1 and facilitate a user to lift the robotic pool cleaner 1 out of water.

Alternatively, a one-way valve is disposed on the discharge port. The one-way valve disposed on the discharge port can ensure the seal of the discharge port in the working process of the robotic pool cleaner 1, that is, when the water inlet sucks in the liquid and/or contaminants in the pool, to prevent the discharge port from interfering with the working process of the robotic pool cleaner.

In the embodiments of this application, a sealed chamber is disposed in the cleaning body 102. The sealed chamber is formed by integrating two sealing housings. The two sealing housings are sealed in a static manner for waterproofing.

In addition, to ensure reliability of movement of the cleaning body 10 and protect live running parts, the drive motor of the drive mechanism 20 is disposed in the sealed chamber, and the output shaft of the drive motor extends out of the cleaning body 10 from the sealed chamber. A dynamic sealing structure is used between the output shaft and the sealed chamber, to ensure that water cannot enter the sealed chamber. The output shaft passes through the housing and couples with the drive wheel 210 of the drive mechanism 20 for transmission.

In the embodiments of this application, two drive wheels 210 are disposed respectively on both sides of the width direction of the cleaning body 10, and the two drive wheels 210 move relatively independently. If the two drive wheels 210 move at a same speed in a same direction, the robotic pool cleaner 1 can move forward or backward. If the two drive wheels 210 move at different speeds or in different directions, the steering of the robotic pool cleaner 1 can be implemented.

In some embodiments of this application, a track 220 is disposed on the drive wheel 210. In this embodiment, the drive wheel 210 comprises a first outer ring gear 211 provided around an axis and a second outer ring gear 212 provided around an outer circumference, wherein the first outer ring gear 211 is externally engaged with the cleaning roller brush mechanism 30 and the second outer ring gear 212 is externally engaged with the track 220, so that the cleaning roller brush mechanism 30 is driven by the first outer ring gear 211 to rotate relative to the cleaning body 10 when the drive motor drives the first outer ring gear 211 to rotate, and to make the track 220 driven by the second outer ring gear 212 to move the cleaning body 10.

In the specific embodiment described above, the drive motor of the robotic pool cleaner 1 serves as a power source to provide power for the drive wheel 210 and the cleaning roller brush mechanism 30, so that the drive wheel 210 and the track 220 move to drive the cleaning body 10 to move in the pool. In addition, in a moving process of the cleaning body 10, the cleaning roller brush mechanism 30 rotates to clean contaminants on surfaces (such as the bottom surface, side walls and the like) of the pool, thereby implementing cleaning and purification of the pool.

Further, in some embodiments of this application, to tension the track 220, the drive mechanism 20 also comprises an engaged wheel 230, which is rotatably disposed on the cleaning body 102. The engaged wheel 230 is located on the same side of the cleaning body 10 as the drive wheel 210, and is spaced apart from the drive wheel 210. Here, the engaged wheel 230 comprises a third outer ring gear 231, and a plurality of mating teeth 221 are disposed on the inner surface of the track 220. When the track 220 is wound on the drive wheel 210 and the engaged wheel 230, the mating teeth 221 of the track 220 are engaged with the second outer ring gear 212 and the third outer ring gear 231 respectively. In this way, the track 220 can be tensioned through the cooperation between the drive wheel 210 and the engaged wheel 230, to ensure stability of movement of the robotic pool cleaner 1.

Therefore, a driving mode of the robotic pool cleaner 1 is specifically as follows: the drive motor rotates to drive the first outer ring gear 211 of the drive wheel 210 to rotate, and the first outer ring gear 211 of the drive wheel 210 rotates to drive the cleaning roller brush mechanism 30 externally engaged with the first outer ring gear 211 to rotate, so that the surfaces of the pool can be cleaned.

In this embodiment, the cleaning roller brush mechanism 30 is disposed on the front side of the cleaning body 10. The cleaning roller brush mechanism 30 comprises a roller brush body 310 and a transmission mechanism 320. The roller brush body 10 is rotatable relative to cleaning body 310 to clean at least some of surfaces of the pool. The transmission mechanism 320 is connected between the roller brush body 310 and the first outer ring gear 211 of the drive wheel 210, to transmit power to the roller brush body 310.

Alternatively, the transmission mechanism 320 may comprise a roller brush gear 321, which is connected to the roller brush body 310 and externally engaged with the first outer ring gear 211 of the drive wheel 210, so that when the roller brush gear 321 is driven by the first outer ring gear 211, this roller brush gear 211 rotates in a reverse direction relative to the drive wheel 210. Alternatively, the transmission mechanism may also comprise a roller brush gear 321 and a carrier unit. The carrier unit is connected between the roller brush gear 321 and the first outer ring gear 211, and when driven by the first outer ring gear 211, the carrier unit may drive the roller brush gear 321 to rotate in the same direction relative to the drive wheel 210. Here, the carrier unit may be, but is not limited to a carrier gear 322, a transmission belt or other suitable gear steering components. This embodiment is set forth by using a carrier gear 322 as an example of the carrier unit, but is not limited thereto. The carrier gear 322 is externally engaged with the roller brush gear 321 and the first outer ring gear 211 respectively, to transmit the power of the first outer ring gear 321 to the roller brush gear 321, and the rotation direction of the roller brush gear 321 is consistent with that of the first outer ring gear 211, i.e., in the same rotation direction as the drive wheel 210.

Therefore, when the drive wheel 210 rotates, the rotation direction of the roller brush gear 321 is adjusted by the carrier gear 322, so that the rotation direction of the roller brush gear 321 is consistent with that of the second outer ring gear 212, and the rotation direction of the roller brush body 310 is consistent with the traveling direction of the robotic pool cleaner 1. In this way, by adjusting the rotation direction of the roller brush body 310, contaminants in the pool removed by the roller brush body 310 are pushed in the direction of the water inlet of the cleaning body 10, so that these contaminants can be sucked in through the water inlet for cleaning and filtering, thereby further improving the cleaning efficiency of the robotic pool cleaner.

Figure 5:
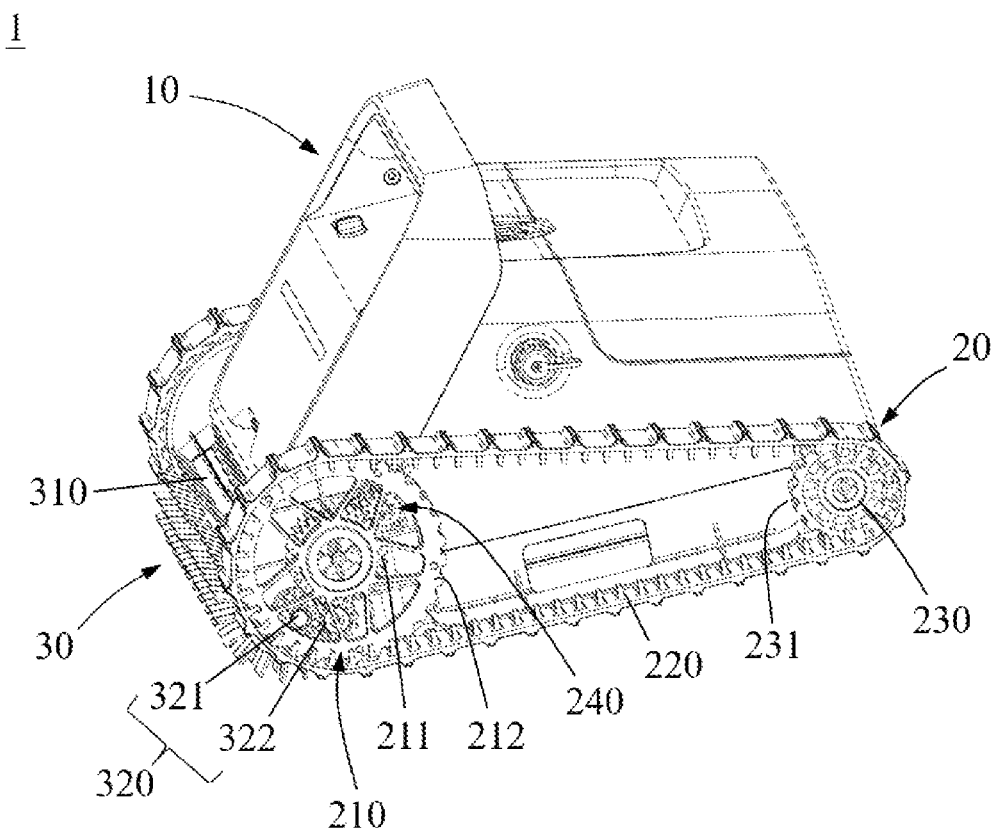
FIG. 5 is a perspective view of a robotic pool cleaner according to another embodiment of this application.
Figure 6:
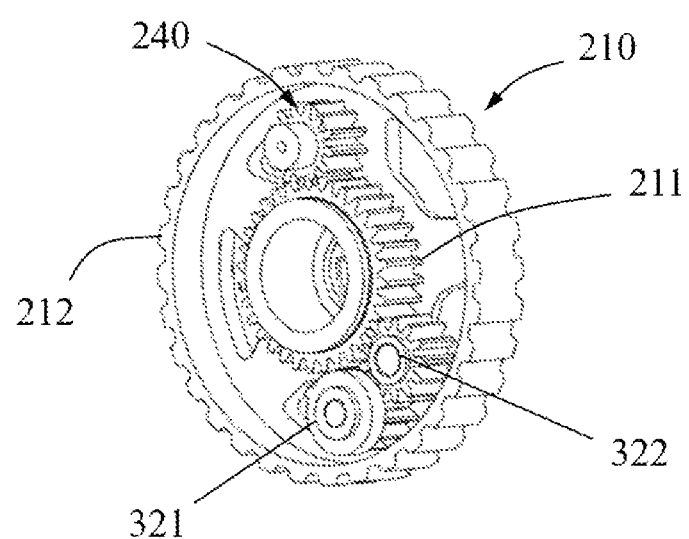
FIG. 6 is a schematic view of a structure of the drive wheel according to the embodiment of FIG. 5, the drive wheel is provided with a driving gear and a cleaning roller brush mechanism.

Please see FIGS. 5-6. The robotic pool cleaner 1 provided in another embodiment of this application filters liquid and/or contaminants in a pool through the cleaning body 10. The drive mechanism 20 is connected to the cleaning body 10, to drive the cleaning body 10 to move in the pool in the working process of the robotic pool cleaner 1. The drive mechanism 20 comprises a drive motor and a drive wheel assembly, wherein the drive motor comprises an output shaft and a driving gear 240 disposed on the output shaft. The drive wheel assembly is rotatably disposed on the cleaning body 10, and the drive wheel assembly comprises at least a drive wheel 210. It can be understood that, in another embodiment of this application, the drive wheel assembly further comprises a track 220. Here, the drive wheel 210 comprises a first outer ring gear 211 and a second outer ring gear 212, the first outer ring gear 211 is externally engaged with the driving gear 240 of the drive motor, and the second outer ring gear 212 is externally engaged with the track 220; the cleaning roller brush mechanism 30 is externally engaged with the first outer ring gear 211, and the cleaning roller brush mechanism 30 is driven by the first outer ring gear 211 to rotate relative to the cleaning body 10 when the drive motor drives the first outer ring gear 211 to rotate.

In the specific embodiment described above, the drive motor of the robotic pool cleaner 1 serves as a power source to provide power for the drive wheel assembly and the cleaning roller brush mechanism 30, so that the drive wheel 210 of the drive wheel assembly and the track 220 drive the cleaning body 10 to move in the pool, and in a moving process of the cleaning body 10, the cleaning roller brush mechanism 30 rotates to clean contaminants on the surfaces of the pool, thereby implementing cleaning and purification of the pool.

A driving mode of the robotic pool cleaner 1 is specifically as follows: the driving gear 240 of the drive motor rotates to drive the first outer ring gear 211 of the drive wheel 210 (which is externally engaged with the driving gear) to rotate, and the first outer ring gear 211 of the drive wheel 210 rotates to drive the cleaning roller brush mechanism 30 (which is externally engaged with the first outer ring gear 211) to rotate, so that the surfaces of the pool can be cleaned.

While the first outer ring gear 211 of the drive wheel 210 is driven by the driving gear 240, the second outer ring gear 212 is driven to transmit power to the outside, so that the track 220 engaged with the second outer ring gear 212 rotates, to move the robotic pool cleaner.

Since the driving gear 240 of the drive motor is externally engaged with the first outer ring gear 211 of the drive wheel 210, the cleaning roller brush mechanism 30 is also externally engaged with the first outer ring gear 211, such external engagement can make assembly simpler and more convenient, and thus requirements on machining precision and machining costs are reduced.

In addition, the robotic pool cleaner 1 implements transmission through the external engagement between the first outer ring gear 211 of the drive wheel 210 and the driving gear 240 of the drive motor, to drive the second outer ring gear 212 of the drive wheel 240 to rotate to implement movement, so that the robotic pool cleaner 1 can move for a longer distance in a certain period of time of movement by using the first outer ring gear 211 with a smaller diameter to drive the second outer ring gear 212 with a larger diameter to rotate, the moving efficiency of the robotic pool cleaner 1 is improved, and accordingly, cleaning efficiency is improved. In addition, the cleaning roller brush mechanism 30 implements rolling by externally engaging with the first outer ring gear 211 of the drive wheel 210. Therefore, if a rotational speed of the cleaning roller brush mechanism 30 is the same as that of a cleaning roller brush mechanism in the prior arts, a cleaning effect can keep unchanged, and periods of time of movement are equal, the cleaning roller brush mechanism 30 can clean for a longer distance as the robotic pool cleaner 1 moves for a longer distance, so that the utilization rate of the cleaning roller brush mechanism 30 is higher, wear of the cleaning roller brush mechanism 30 is reduced to some extent, and the service life of the cleaning roller bush mechanism 30 is prolonged.

In some embodiments of this application, the first outer ring gear 211 and the second outer ring gear 212 of the drive wheel 210 are disposed coaxially, and both can be rigidly connected to each other. When the driving gear 240 of the drive motor drives the first outer ring gear 211 to rotate, the second outer ring gear 212 and the first outer ring gear 211 rotate coaxially at a same rotational speed; the diameter of the first outer ring gear 211 of the drive wheel 210 is smaller than that of the second outer ring gear 212, so that at a same rotational speed, the second outer ring gear 212 drives the cleaning body 10 to move for a longer distance because the circumference length of the second outer ring gear 212 is longer, thereby increasing the moving speed of the robotic pool cleaner 1. With a same pool area, the robotic pool cleaner 1 moves faster, and this indicates that it takes less time to clean the pool once, that is, the cleaning efficiency is improved.

Further, to ensure efficiency of the driving gear 240 for external transmission, in particular, a first transmission ratio between the driving gear 240 of the drive motor and the first outer ring gear 211 is smaller than a first set value. Here, the first transmission ratio refers to a ratio of a rotational speed of an input gear to a rotational speed of an output gear. Specifically, in this example, the first transmission ratio may be a ratio between a rotational speed of the driving gear 240 and a rotational speed of the first outer ring gear 211. It is easy to learn from the definition of the first transmission ratio that since the rotational speed of the driving gear 240 is related to a rotational speed of the drive motor, if the rotational speed of the drive motor is constant, a higher rotational speed of the first outer ring gear 211 indicates a smaller first transmission ratio, that is, a higher rotational speed of the first outer ring gear 211 indicates a higher moving speed of the cleaning body.

In a feasible implementation, the first set value may be 2.5:1 (i.e., 5:2), and this transmission ratio can ensure that the moving speed of the cleaning body 10 meets a requirement and the cleaning body does not move too slowly, and can also ensure that the cleaning effect is moderate, and ineffective cleaning due to an excessively high moving speed is avoided.

In an example, a quantity of teeth of the driving gear 240 of the drive motor ranges from 10 to 15, for example 13, and a quantity of teeth of the first outer ring gear 211 ranges from 30 to 35, for example 32. Certainly, in another example, the first set value may be another value.

Figure 7:
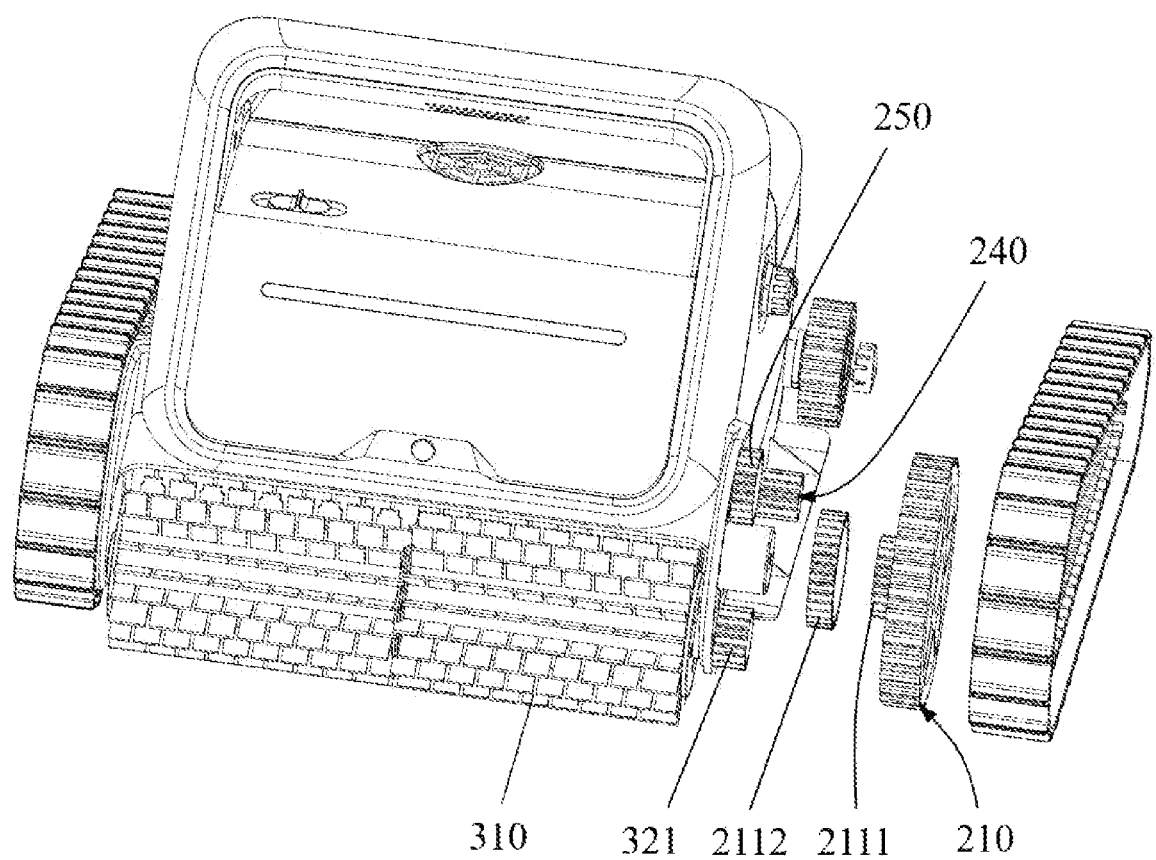
FIG. 7 is a partial exploded view of a robotic pool cleaner according to an embodiment of this application.
Figure 8:
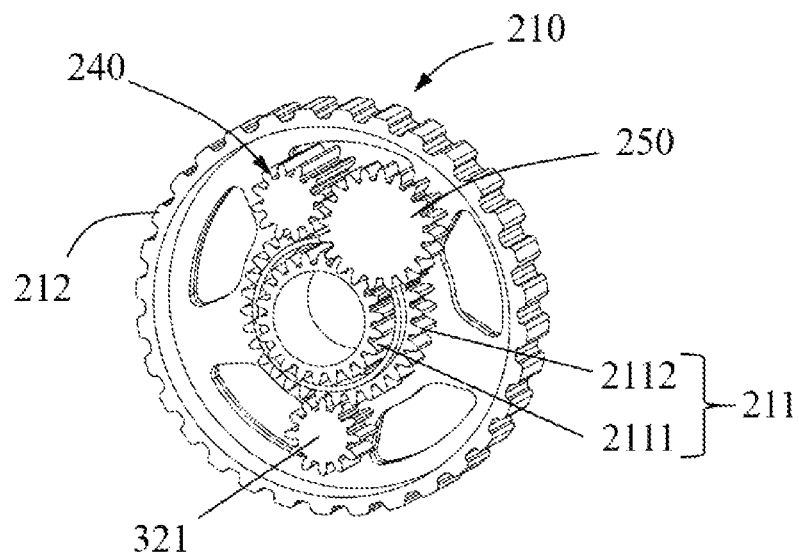
FIG. 8 is a schematic view of a structure of the drive wheel according to the embodiment of FIG. 7, the drive wheel is provided with a driving gear and a cleaning roller brush mechanism.

As shown in FIGS. 7-8. In one embodiment of this application, a first outer ring gear 211 of a drive wheel 210 comprises a first tooth segment 2111 and a second tooth segment 2112. The first tooth segment 2111 and the second tooth segment 2112 are sequentially arranged on the side facing the cleaning body 10 along the axial direction of the drive wheel 210, and the diameter of the first tooth segment 2111 may be, but is not limited to be smaller than that of the second tooth segment 2112. Here, the second tooth segment 2112 is configured to be rotatable relative to the first tooth segment 2111, for example, by providing a steering gear or other linkage mechanism or gear steering mechanism between the first tooth segment 2111 and the second tooth segment 2112, to allow the second tooth segment 2112 to rotate in a reverse direction relative to the first tooth segment 2111; alternatively, the first tooth segment 2111 and the drive wheel 210 are coaxially and rigidly connected to each other, the second tooth segment 2112 is coaxially sleeved on the first tooth segment 2111, and another carrier gear 250 is disposed between the driving gear 240 and the first tooth segment 2111, wherein, the driving gear 240 is externally engaged with the carrier gear 250 and the second tooth segment 2112 respectively, the carrier gear 250 is externally engaged with the driving gear 240 and the first tooth segment 2111 respectively. Therefore, when the carrier gear 250 and the second tooth segment 211 are driven by the driving gear 240 to rotate, the first tooth segment 2111 is driven to rotate through the carrier gear 250, and thus the drive wheel 210 rotates, as well as the roller brush gear 321 is driven by the second tooth segment 211 to rotate, at this time, since the second tooth segment 2112 and the first tooth segment 2111 rotate in two reverse directions, so that the rotation direction of the roller brush gear 321 is adjusted to be consistent with that of drive wheel 210, so as to drive the roller brush body 310 to rotate synchronously in the direction of the water inlet, and facilitate the water inlet to suck in the contaminants for implementing the cleaning and filtering process.

Figure 9:
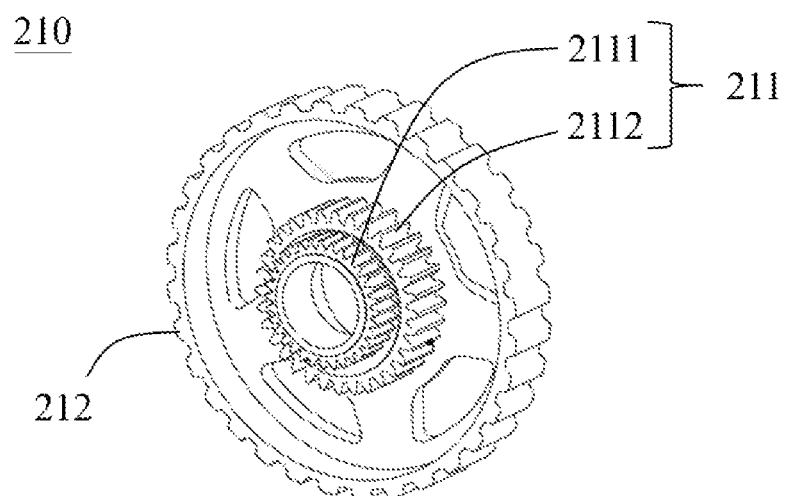
FIG. 9 is a schematic view of a structure of a drive wheel according to another embodiment of this application.

As shown in FIG. 9. It can be understood that, in another embodiment of this application, a second tooth segment 2112 can be fixed on the drive wheel 210, and is not rotatable relative to the first tooth segment 2111. For example, the first tooth segment 2111 and the second tooth segment 2112 are formed by performing segmentation processing on the first outer ring gear 211 of the drive wheel 210. In this embodiment, a driving gear of a drive motor is externally engaged with the first tooth segment 2111, a roller brush gear is externally engaged with the second tooth segment 2112 through a carrier gear, or, externally engaged directly with the second tooth segment 2112.

In addition, by performing segmentation processing on the first outer ring gear 211, the first tooth segment 2111 and the second tooth segment 2112 can be processed to have different quantity of teeth and different diameters, so that different transmission ratios are implemented, and therefore, the drive wheel 210 can be externally engaged with the driving gear of the drive motor through the first tooth segment 2111 to obtain a high rotational speed, and the robotic pool cleaner can move quickly. In addition, the cleaning roller brush mechanism is externally engaged with the second tooth segment 2112, and the rotational speed of the cleaning roller brush mechanism can be controlled, so that the rotational speed of the cleaning roller brush mechanism can meet a cleaning requirement while the cleaning effect is ensured. For example, the rotational speed of the cleaning roller brush mechanism is ensured to be not less than 100 revolutions per minute, so that the rotational speed of the cleaning roller brush mechanism is increased to obtain a better cleaning force, and contaminants can be effectively cleaned.

Similarly, in another specific embodiment, the second outer ring gear 212 of the drive wheel 210 is coaxially disposed with the first outer ring gear 211, and the second outer ring gear 212 is rotatable relative to the first outer ring gear 211. The diameter of the first outer ring gear 211 of the drive wheel 210 is smaller than that of the second outer ring gear 212. The second outer ring gear 212 is configured to rotate relative to the first outer ring gear 211, so that the rotational speeds of the first outer ring gear 211 and the second outer ring gear 212 may be different, and therefore, the rotational speed of the second outer ring gear 212 is increased without changing the rotational speed of the first outer ring gear 211, so that the moving efficiency of the robotic pool cleaner 1 is higher.

For example, a rotational speed adjusting structure is disposed between the first outer ring gear 211 and the second outer ring gear 212, so that the rotational speeds of the first outer ring gear 211 and the second outer ring gear 212 are different. The rotational speed adjusting structure may be a gear, a sprocket, a chain assembly or the like, provided that the rotational speeds of the first outer ring gear 211 and the second outer ring gear 212 can be adjusted.

In addition, in this embodiment, the quantities of teeth and the diameters of the carrier gear 322, the roller brush gear 321 of the cleaning roller brush mechanism 30, and the driving gear 240 of the drive mechanism 20 may be equivalent, that is, the three each may comprise 13 teeth, and have a diameter of 203 mm. Certainly, the quantities of teeth and the diameters are only an example and are not limited thereto.

In a specific implementation, a second transmission ratio between the driving gear 240 and the cleaning roller brush mechanism 30 can be 1:1. The second transmission ratio may be a ratio of a speed of the input gear to a speed of the output gear, that is, a ratio of the rotational speed of the driving gear 240 to the rotational speed of the cleaning roller brush mechanism 30 is the second transmission ratio, and when the second transmission ratio is 1:1, it indicates that the rotational speed of the cleaning roller brush mechanism 30 may be high to meet a cleaning requirement.

Certainly, in another embodiment, the second transmission ratio may be another ratio, and is not limited thereto.

Figure 10:
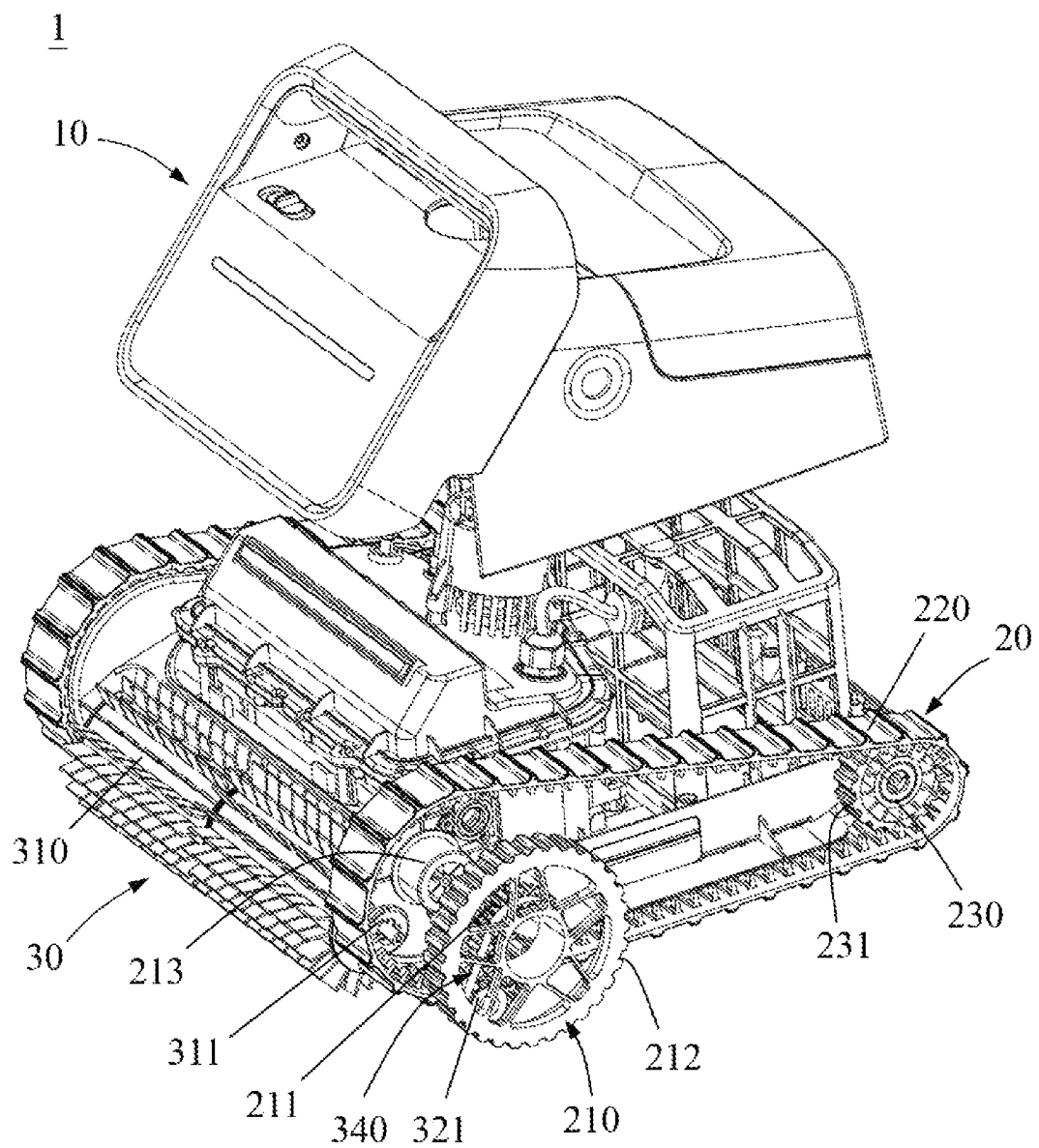
FIG. 10 and FIG. 11 are partial exploded views of a robotic pool cleaner from different perspectives according to an embodiment of the present application, respectively.
Figure 11:
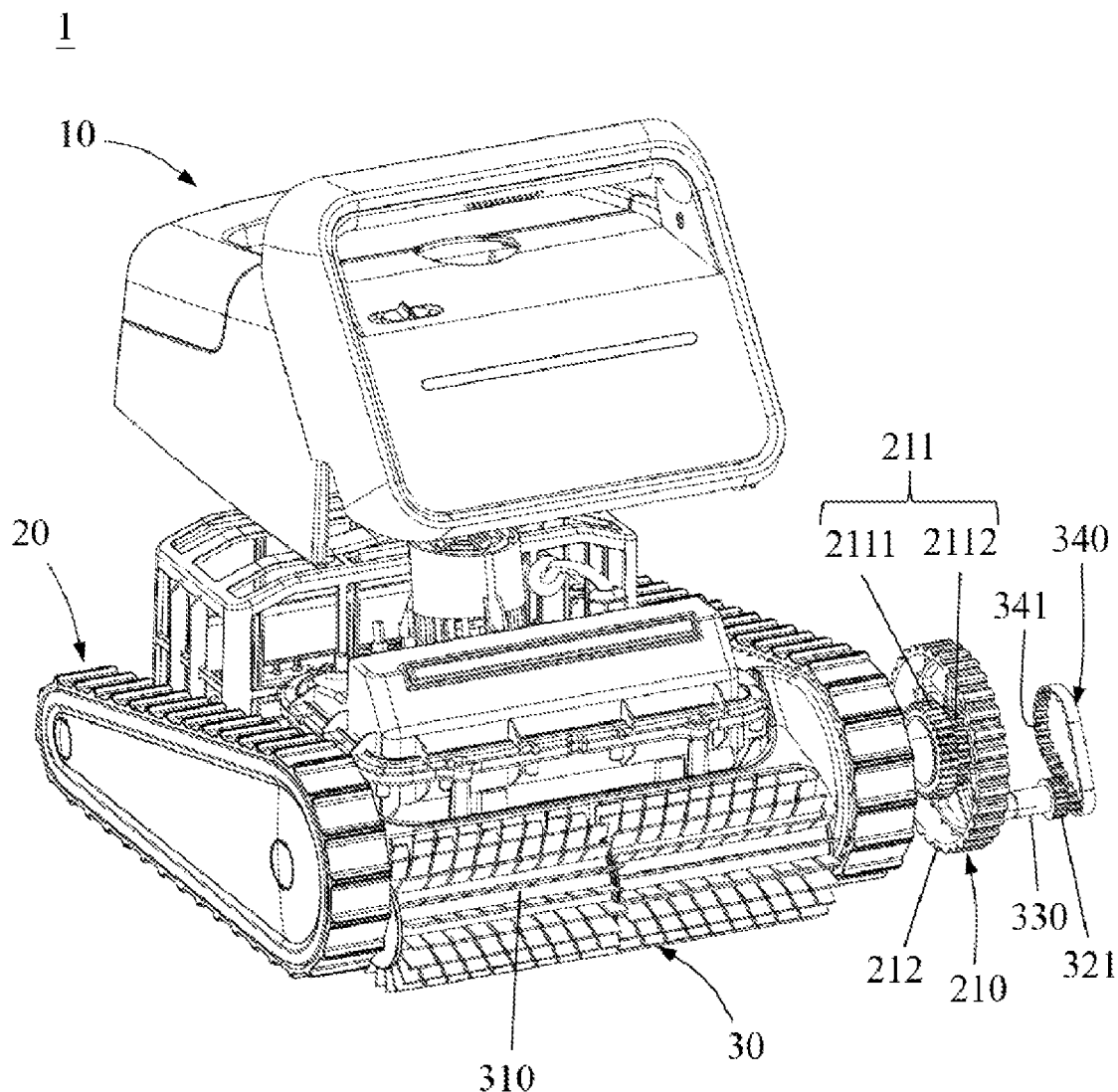
Figure 12:
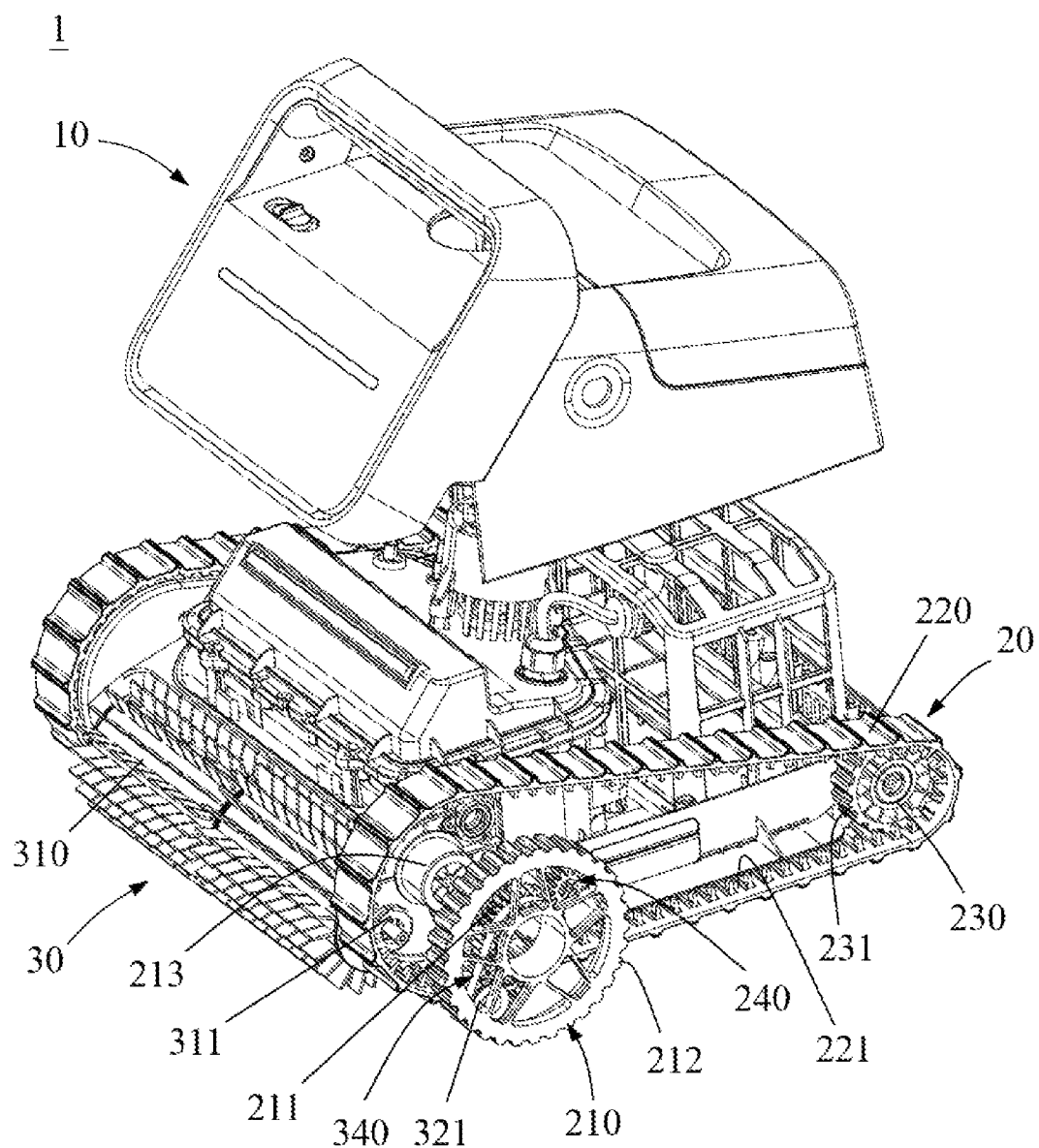
FIG. 12 and FIG. 13 are partial exploded views of a robotic pool cleaner from different perspectives according to another embodiment of the present application, respectively.
Figure 13:
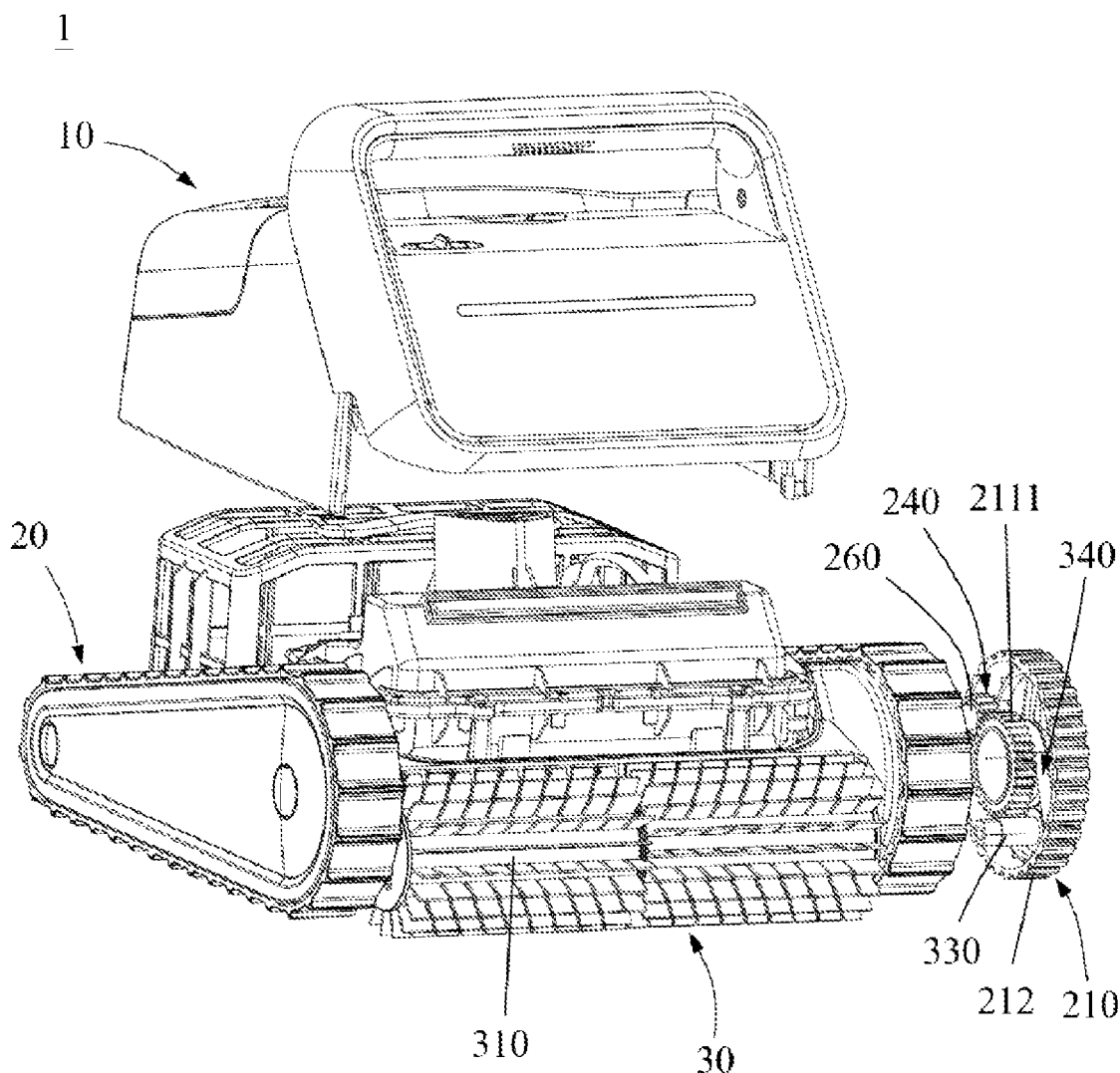

Please see FIGS. 10-11. One embodiment of this application provides a robotic pool cleaner comprising a cleaning body 10, a drive mechanism 20 and a cleaning roller brush mechanism 30. The robotic pool cleaner 1 sucks in liquid and/or contaminants through the cleaning body 10, filters the liquid and/or contaminants through the cleaning body 10, leaves the contaminants inside the cleaning body 10, and discharges filtered liquid into the pool again. The foregoing process is repeated to complete filtering of the liquid in the pool. The drive mechanism 20 is connected to the cleaning body 10, to drive the cleaning body 10 to move in the pool in the working process of the robotic pool cleaner 1. Therefore, while the liquid and/or contaminants is filtered through the cleaning body 10, as the cleaning body 10 moves in the pool, at least some of surfaces of the pool are cleaned by the cleaning roller brush mechanism 30, to complete cleaning the bottom and side walls of the pool, thereby achieving a purpose of cleaning the entire pool.

In this embodiment, the overall structure of the robotic pool cleaner is substantially the same as that of the above embodiment, and the differences between both embodiments are mainly described below.

Two drive wheels 210 of the drive mechanism 20 are pivotally connected to the two opposite sides of the cleaning body 10, and each drive wheel 20 is provided with a first outer ring gear 211 set around the axis. The cleaning roller brush mechanism 30 comprises a roller brush body 310, a roller brush belt wheel 330 and a transmission belt 340. The drive end 311 of the roller brush body 310 is pivotally disposed on the cleaning body 10, and is exposed to a side of the cleaning body 10. One end of the roller brush belt wheel 330 is engaged with the drive end 311 of the roller brush body 310, and the other end extends into the drive wheel 210 and corresponds to the first outer ring gear 211. The transmission belt 340 is wound on the roller brush belt wheel 330 and the first outer ring gear 211 of the drive wheel. Therefore, when the drive motor drives the drive wheel 210 to rotate, the first outer ring gear 211 transmits power to the roller brush belt wheel 330 through the transmission belt 340, to drive the roller brush body 310 to rotate relative to the cleaning body 10. Therefore, the drive motor of the robotic pool cleaner 1 serves as a power source to provide power for the drive wheel 210 and the cleaning roller brush mechanism 30, so that the drive wheel 210 rotates relative to cleaning body 10, to drive the cleaning body 10 to move in the pool. In addition, in a moving process of the cleaning body 10, the drive wheel 210 drives the roller brush body 310 to rotate together through the transmission belt 340, to synchronously clean contaminants on surfaces (such as the bottom surface, side walls and the like) of the pool, thereby implementing cleaning and purification of the pool.

In this embodiment, the end of roller brush belt wheel 330, which corresponds to the first outer ring gear 211, may be, but is not limited to be provided with a roller brush belt wheel 321. An inner ring gear 341 is disposed on the inner surface of the transmission belt 340, so that the transmission belt 340 in a synchronous belt structure is wound on the roller brush gear 321 and the first outer ring gear 211 of the drive wheel 210, and is respectively engaged with the roller brush gear 321 and the first outer ring gear 211 through the inner ring gear 341. Therefore, when the transmission belt 34 is driven by the first outer ring gear 211, the roller brush gear 321 is synchronously driven to rotate, so that in the moving process of the robotic pool cleaner 1, the roller brush body 310 can synchronously clean contaminants on the surfaces of the pool.

Here, in addition to the synchronous belt structure, the transmission belt 340 may also be in the forms of a flat belt structure, a V-belt structure, a multiple-wedge belt structure or other suitable structure, wound between the first outer ring gear 211 and roller brush belt wheel 330, but is not limit to the above embodiment. It will be further explained below by other embodiments of this application.

Please see FIGS. 12-16. In the robotic pool cleaner 1 provided by other embodiments of this application, the drive mechanism 20 comprises a drive motor and a drive wheel assembly, wherein the drive motor comprises an output shaft 260 and a driving gear 240 disposed on the output shaft 260. The drive wheel assembly is rotatably disposed on the cleaning body 10, and the drive wheel assembly comprises at least a drive wheel 210. It can be understood that, in this embodiment, the drive wheel assembly may further optionally comprise a track 220 and an engaged wheel 230. Here, the drive wheel 210 comprises a first outer ring gear 211 and a second outer ring gear 212, and the first outer ring gear 211 is externally engaged with the driving gear 240 of the drive motor. The track 220 is wound on the drive wheel 210 and the engaged wheel 230, and through the mating teeth 221 is engaged with the second outer ring gear 212 and the third outer ring gear 231 respectively. In this way, the track 220 can be tensioned through the cooperation between the drive wheel 210 and the engaged wheel 230, to ensure stability of movement of the robotic pool cleaner 1.

In addition, in this embodiment, a first tooth segment 2111 and a second tooth segment 2112 are disposed on the first outer ring gear 211 of the drive wheel 210. The diameter of the first tooth segment 2111 is larger than that of the second tooth segment 2112, and the first tooth segment 2111 and the second tooth segment 2112 are sequentially disposed in an axial direction of the drive wheel 210. The driving gear 240 of the drive motor is engaged with the first tooth segment 2111, and the transmission belt 340 is wound on the second tooth segment 2112 and the roller brush belt wheel 330.

Figure 14:
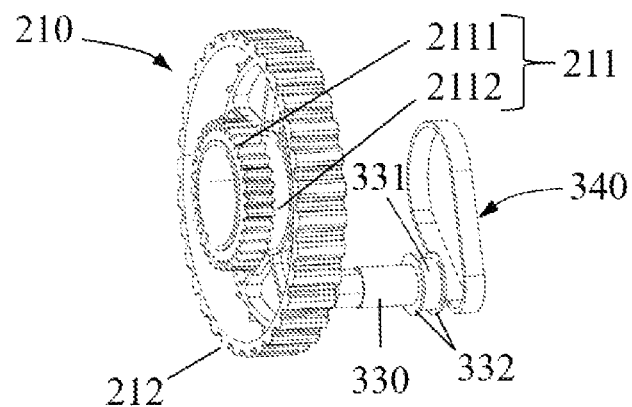
FIG. 14 to FIG. 16 are schematic views of a structure of a drive wheel provided with different forms of transmission belts according to other embodiments of this application, respectively.

Here, in addition to transmission manner mentioned in the above embodiment of providing a roller brush belt wheel 321 and winding a transmission belt 340 in a synchronous belt structure on a roller brush gear 321 and a second tooth segment 2112, it is also possible to arrange the end of roller brush belt wheel 330, which corresponds to the second tooth segment 2112, on the sleeve portion 331, and set the outer circumference of the sleeve portion 331 and the outer circumference of the second tooth segment 2112 in a flat structure. Therefore, the flat inner surface of the transmission belt 340 is design in form of a flat belt structure, so that the transmission belt 340 may be affixed to the outer circumference of the roller brush belt wheel 330 and the outer circumference of the second tooth segment 2112, to transmit the power by friction and/or press between them (as shown in FIG. 14). In this embodiment, it is also possible to form a convex ring 332 on two opposite sides of the sleeve portion 331 respectively, where the convex ring 332 has an outer diameter larger than the average outer diameter of the roller brush belt wheel 330, therefore, when the transmission belt 340 is wound on the sleeve portion 331, the transmission belt 340 is restricted by the sleeve portion 331 to avoid the left-right displacement of the transmission belt 340 in the axial direction of the roller brush belt wheel 330 during the rotation.

Figure 15:
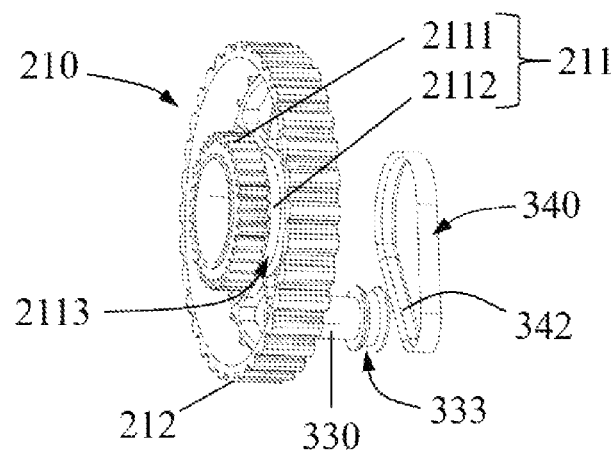

Alternatively, a rib 342 (such as a trapezoidal rib) projecting inward from the surface is provided around inner surface of the transmission belt 340, and a first recess 333 is provided around the outer circumference of the roller brush belt wheel 330, a second recess 2113 is provided around the outer circumference of the second tooth segment 2112, the structures of the first recess 333 and second recess 2113 match the structure of the rib 342, so that the transmission belt 340 in V-belt structure is embedded in the first recess 333 and the second recess 2113 through the rib 342 (as shown in FIG. 15).

Figure 16:
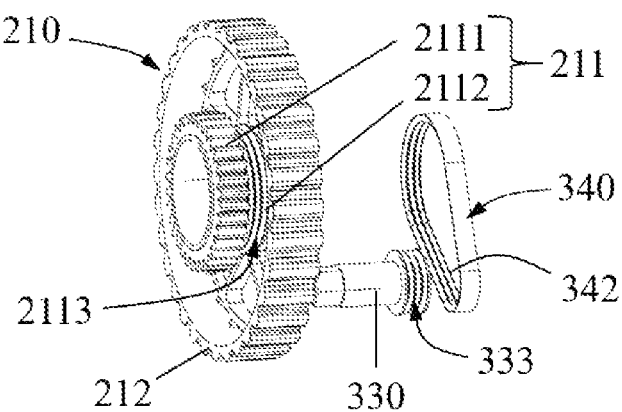

Alternatively, a plurality of ribs 342 arranged along the width direction of the inner surface of the transmission belt 340 are disposed on the inner surface, and the quantity of the first recess 333 and the second recess 2112 corresponds to the quantity of the ribs 342, so that the transmission belt 340 in multiple-wedge belt structure is embedded in the roller brush belt wheel 330 and the corresponding recesses 333, 2113 on the second tooth segment 2112 through the ribs 342 (as shown in FIG. 16).

Hereby, the contact area between the transmission belt 340 and the second tooth segment 2112 of the drive wheel 210 as well as the contact area between the transmission belt 340 and the sleeve portion of the roller brush belt wheel 330 are enlarged, and therefore the friction is increased accordingly to avoid the transmission belt 340 from slipping during rotation, and ensure the transmission of power.

In this way, while the drive motor drives the drive wheel 240 through an output shaft 260 to rotate, the transmission belt 340 is driven through the second tooth segment 2112 to synchronously drive the roller brush belt wheel 330 to rotate, so that as the rotation of the roller brush belt wheel 330, the roller brush body 310 rotates relative to the cleaning body 10, and synchronously cleans contaminants on the surfaces on the pool. In addition, by performing segmentation processing on the first outer ring gear 211, the first tooth segment 2111 and the second tooth segment 2112 can be processed to have different quantity of teeth and different diameters, so that different transmission ratios are implemented, and therefore, the drive wheel 210 can be externally engaged with the driving gear 240 of the drive motor through the first tooth segment 2111 to obtain a high rotational speed, and the robotic pool cleaner 1 can move quickly. Further, the cleaning roller brush mechanism 30 is coupled with the second tooth segment 2112 of the drive wheel 210 through the transmission belt 340 to control the rotational speed of the cleaning roller brush mechanism 30, so that the rotational speed of the cleaning roller brush mechanism 30 can meet the cleaning requirements while ensuring the cleaning effect. The rotational speed of the cleaning roller brush mechanism 30 is high enough to obtain a better cleaning force, and contaminants can be effectively cleaned.

In conclusion, the cleaning roller brush mechanism of the robotic pool cleaner according to the embodiments of this application is externally engaged with the drive wheel for cooperation, so that the robotic pool cleaner has a high overall moving speed if the rotational speed of the cleaning roller brush mechanism is not reduced, to improve the cleaning efficiency.

It should be understood that although this specification is described in accordance with various embodiments, each embodiment does not contain only one independent technical solution, and such a description manner of the specification is merely intended for the sake of clarity and the specification should be taken as a whole by those skilled in the art. The technical solutions in the various embodiments may be suitably combined to form other implementations that may be understood by those skilled in the art.

The foregoing descriptions are merely schematic implementations of the embodiments of this application, and are not construed as a limitation on the scope of the embodiments of this application. Any equivalent variations, modifications and combinations made by those skilled in the art without departing from the concepts and principles of the embodiments of this application shall fall within the scope of protection of the embodiments of this application.

The invention claimed is:

1. A robotic pool cleaner, comprising:
a cleaning body, which includes a water inlet and a water outlet separated from the water inlet;
a drive wheel, which is configured to rotate relative to the cleaning body, and includes a first outer ring gear and a second outer ring gear with the first outer ring gear arranged within a space defined by the second outer ring gear; and
a cleaning roller brush mechanism, which includes a roller brush belt wheel and a transmission belt, the transmission belt is wound on the roller brush belt wheel and the first outer ring gear, and when the drive wheel rotates, the roller brush belt wheel is driven by the first outer ring gear to rotate relative to the drive wheel, so that the cleaning roller brush mechanism rotates relative to the cleaning body.

2. The robotic pool cleaner according to claim 1, wherein one end of the roller brush belt wheel extends into the drive wheel, and is provided with a sleeve portion, the sleeve portion corresponds to the first outer ring gear, and the transmission belt is wound on the sleeve portion and the first outer ring gear.

3. The robotic pool cleaner according to claim 2, wherein the sleeve portion is provided with a roller brush gear, an inner ring gear is disposed on the inner surface of the transmission belt, the inner ring gear is engaged with the roller brush gear and the first outer ring gear respectively.

4. The robotic pool cleaner according to claim 2, wherein the outer circumference of the sleeve portion and the outer circumference of the first outer ring gear are flat, and the inner surface of the transmission belt is attached to the outer circumference of the sleeve portion and the outer circumference of the first outer ring gear respectively.

5. The robotic pool cleaner according to claim 2, wherein a first recess is provided around the sleeve portion, a second recess is provided around the first outer ring gear, the transmission belt is provided with a rib projecting inward from the inner surface, and the rib is engaged in the first and second recesses.

6. The robotic pool cleaner according to claim 5, wherein a plurality of ribs are arranged along the width direction of the transmission belt, and the quantity of the first recesses and the second recesses corresponds to the quantity of the ribs.

7. The robotic pool cleaner according to claim 1, wherein the robotic pool cleaner further comprises a drive motor and a driving gear, the drive motor is connected to the driving gear, the driving gear is externally engaged with the first outer ring gear, and is driven by the drive motor to rotate the first outer ring gear.

8. The robotic pool cleaner according to claim 7, wherein a first transmission ratio between the driving gear and the first outer ring gear is smaller than a first set value.

9. The robotic pool cleaner according to claim 7, wherein a second transmission ratio between the driving gear and the cleaning roller brush mechanism is 1:1.

10. The robotic pool cleaner according to claim 7, wherein the first outer ring gear comprises a first tooth segment and a second tooth segment, the first tooth segment and the second tooth segment are sequentially arranged on the side facing the cleaning body 10 along the axial direction of the drive wheel, the driving gear is externally engaged with the first tooth segment, and the transmission belt is wound on the second tooth segment and the roller brush belt wheel.

11. The robotic pool cleaner according to claim 10, wherein a diameter of the first tooth segment is larger than a diameter of the second tooth segment.

12. The robotic pool cleaner according to claim 1, wherein the cleaning roller brush mechanism further comprises a roller brush body, which is disposed on a side of the cleaning body, and is rotatable relative to the cleaning body, to clean parts of surfaces of a pool.

13. The robotic pool cleaner according to claim 12, wherein a rotation direction of the cleaning roller brush mechanism is configured to push liquid and/or contaminants toward the water inlet.

14. The robotic pool cleaner according to claim 1, wherein the water inlet is used for sucking in liquid and/or contaminants in a pool, and in a traveling direction of the robotic pool cleaner, the water inlet is behind the cleaning roller brush mechanism.

15. The robotic pool cleaner according to claim 1, wherein the robotic pool cleaner further comprises a track, a diameter of the first outer ring gear is smaller than a diameter of the second outer ring gear, the first outer ring gear and the second outer ring gear are disposed coaxially, the track is wound on the drive wheel and externally engaged with the second outer ring gear.

16. The robotic pool cleaner according to claim 15, wherein the robotic pool cleaner further comprises an engaged wheel, the engaged wheel and the drive wheel are disposed with a distance on the cleaning body, and can rotate relative to the cleaning body, and the engaged wheel comprises a third outer ring gear, a plurality of mating teeth are disposed on an inner surface of the track, and the mating teeth are engaged with the second outer ring gear and the third outer ring gear respectively.

17. The robotic pool cleaner according to claim 15, wherein the second outer ring gear is connected to the first outer ring gear, the second outer ring gear is rotatable relative to the first outer ring gear, a rotational speed adjusting structure is disposed between the first outer ring gear and the second outer ring gear such that rotational speeds of the first outer ring gear and the second outer ring gear are different.

* * * * *